(12) United States Patent
Hemphill et al.

(10) Patent No.: US 10,603,694 B2
(45) Date of Patent: Mar. 31, 2020

(54) SONICATING BATH FOR ANODE FOILS

(71) Applicant: PACESETTER, INC., Sunnyvale, CA (US)

(72) Inventors: Ralph Jason Hemphill, Sunset, SC (US); David R. Bowen, Taylors, SC (US); James Brian Smith, Pickens, NC (US); Xiaofei Jiang, Clemson, SC (US); Troy L. McCurry, West Union, SC (US)

(73) Assignee: PACESETTER, INC, Sylmar, CA (US)

( * ) Notice: Subject to any disclaimer, the term of this patent is extended or adjusted under 35 U.S.C. 154(b) by 67 days.

(21) Appl. No.: 15/960,366

(22) Filed: Apr. 23, 2018

(65) Prior Publication Data
US 2018/0240604 A1 Aug. 23, 2018

Related U.S. Application Data (62) Division of application No. 14/849,064, filed on Sep. 9, 2015, now Pat. No. 9,991,056.

(51) Int. Cl.
| | |
|---|---|
| *B08B 3/12* | (2006.01) |
| *H01G 9/055* | (2006.01) |
| *C25F 3/02* | (2006.01) |
| *H01G 9/00* | (2006.01) |
| *B08B 1/00* | (2006.01) |
| *H01G 9/045* | (2006.01) |

(52) U.S. Cl.
CPC ............ *B08B 3/12* (2013.01); *B08B 1/00* (2013.01); *C25F 3/02* (2013.01); *H01G 9/0029* (2013.01); *H01G 9/055* (2013.01); *H01G 9/045* (2013.01)

(58) Field of Classification Search
CPC ....................................................... B08B 3/12
See application file for complete search history.

(56) References Cited

U.S. PATENT DOCUMENTS

| | | | |
|---|---|---|---|
| 3,967,632 A * | 7/1976 | Herrmann | C23F 1/08 134/83 |
| 5,131,388 A | 7/1992 | Pless et al. | |
| 5,143,587 A | 9/1992 | Endoh | |
| 5,194,127 A | 3/1993 | Endoh | |
| 6,802,954 B1 | 10/2004 | Hemphill et al. | |

(Continued)

OTHER PUBLICATIONS

Notice of Allowance dated Feb. 12, 2018; Related U.S. Appl. No. 14/849,064.

*Primary Examiner* — Nicholas A Smith
(74) *Attorney, Agent, or Firm* — Theresa A. Raymer (57) ABSTRACT

A process and apparatus are presented for cleaning the tunnels of an electrochemically etched anode foil. The apparatus includes a tank, a fluid inlet and a fluid outlet, and one or more tranducers. The tank is designed to receive a plurality of cartridges, each of the plurality of cartridges having a reservoir and being designed to hold a metal foil. The fluid inlet and fluid outlet are coupled with at least one of the plurality of cartridges, and are designed to introduce and expel, respectively, a liquid from the reservoir within at least one of the plurality of cartridges. The one or more transducers are coupled to at least one wall of each reservoir, the one or more transducers being designed to sonicate the liquid within each reservoir at a frequency less than 300 Hz.

10 Claims, 10 Drawing Sheets

(56) References Cited

U.S. PATENT DOCUMENTS

| | | | |
|---|---|---|---|
| 2002/0144709 A1* | 10/2002 | Kashkoush | B08B 3/12 134/1.3 |
| 2004/0149308 A1* | 8/2004 | Korbler | B08B 3/12 134/1.3 |
| 2008/0017560 A1* | 1/2008 | Matsuura | B01D 1/0017 210/151 |
| 2013/0026048 A1 | 1/2013 | Bowen | |
| 2015/0211145 A1 | 7/2015 | Hemphill | |

* cited by examiner

SONICATING BATH FOR ANODE FOILS

PRIORITY

This application is a Divisional Application of U.S. patent application Ser. No. 14/849,064, filed Sep. 9, 2015, incorporated herein by reference in its entirety to provide continuity of disclosure.

FIELD

The present invention relates generally to the field of electrochemical etching of anode foils for use in electrolytic capacitors.

BACKGROUND

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

Implantable Cardioverter Defibrillators, such as those disclosed in U.S. Pat. No. 5,131,388, incorporated herein by reference, typically use two electrolytic capacitors in series to achieve the desired high voltage for shock delivery. For example, an implantable cardioverter defibrillator may utilize two 350 to 400 volt electrolytic capacitors in series to achieve a voltage of 700 to 800 volts.

Electrolytic capacitors are used in ICDs because they have the most nearly ideal properties in terms of size, reliability and ability to withstand relatively high voltage. Conventionally, such electrolytic capacitors include an etched aluminum foil anode, an aluminum foil or film cathode, and an interposed kraft paper or fabric gauze separator impregnated with a solvent-based liquid electrolyte. While aluminum is the preferred metal for the anode plates, other metals such as tantalum, magnesium, titanium, niobium, zirconium and zinc may be used. A typical solvent-based liquid electrolyte may be a mixture of a weak acid and a salt of a weak acid, preferably a salt of the weak acid employed, in a polyhydroxy alcohol solvent. The electrolytic or ion-producing component of the electrolyte is the salt that is dissolved in the solvent. The entire laminate is rolled up into the form of a substantially cylindrical body, or wound roll, that is held together with adhesive tape and is encased, with the aid of suitable insulation, in an aluminum tube or canister. Connections to the anode and the cathode are made via tabs. Alternative flat constructions for aluminum electrolytic capacitors are also known, comprising a planar, layered, stack structure of electrode materials with separators interposed therebetween, such as those disclosed in the above-mentioned U.S. Pat. No. 5,131,388.

In ICDs, as in other applications where space is a critical design element, it is desirable to use capacitors with the greatest possible capacitance per unit volume. Since the capacitance of an aluminum electrolytic capacitor is provided by the anodes, a clear strategy for increasing the energy density in the capacitor is to minimize the volume taken up by paper and cathode and maximize the number of anodes. A multiple anode stack configuration requires fewer cathodes and paper spacers than a single anode configuration and thus reduces the size of the device. A multiple anode stack consists of a number of units consisting of a cathode, a paper spacer, two or more anodes, a paper spacer and a cathode, with neighboring units sharing the cathode between them. Energy storage density can be increased by using a multiple anode stack configuration element; however, the drawback is that the equivalent series resistance, ESR, of the capacitor increases as the conduction path from cathode to anode becomes increasingly tortuous. To charge and discharge the inner anodes (furthest from the cathode) charge must flow through the outer anodes. With typical anode foil, the path through an anode is quite tortuous and results in a high ESR for a multiple anode stack configuration. By keeping the ESR low, however, the charge efficiency and DSR (delivered to stored energy ratio) of the capacitor are maximized.

The conduction path from the cathode to the inner anodes may be made less tortuous by providing pores in the outer anode foil. In this manner, charge can flow directly through the outer anodes to the inner anodes. Thus, the use of porous anode foil can combat the increase in ESR resulting from the use of a multiple anode stack configuration. U.S. Pat. No. 6,802,954 to Hemphill et al., incorporated herein by reference, describes an electrochemical drilling process for creating porous anode foil for use in multiple anode stack configuration electrolytic capacitors which produces a pore structure that is microscopic in pore diameter and spacing, allowing for increased energy density with a minimal increase in ESR of the capacitor. An etched foil is placed into an electrochemical drilling solution and a DC power supply is used to electrochemically etch the foil in the electrochemical drilling solution such that pores on the order of a few microns diameter are produced through the foil. The electrochemical drilling process creates large diameter "through" type tunnels, or pathways, in the foil that increase the electrical porosity of the foil, thereby improving charge efficiency and DSR. Aluminum Electrolytic Capacitors energy density is directly related to the surface area of the anodes generated in the electrochemical etching processes. Typical surface area increases achieved by etching can be 40 to and represent 30 to 40 million tunnels/$cm^2$. An electrochemical widening step is used to increase the tunnel diameter after etching to ensure that the formation of oxide will not close off the tunnels. Closing off of the tunnels during oxide formation will reduce capacitance and electrical porosity.

Adding Polystyrenesulfonic acid (PSSA) to the widening solution has been shown to improve the foil capacitance by protecting the foil surface form erosion and pitting, allowing the widening current to focus on the etch tunnel enlargement. However, the PSSA molecule has a tendency to combine with aluminum in the solution through flocculation that leads to inefficient use of the molecule to protect the surface during widening. Additionally after widening, the affinity of the PSSA to aluminum decreases the likelihood of efficiently removing the aluminum and PSSA from the tunnel structures.

BRIEF SUMMARY

An apparatus and method are presented that includes efficient removal of the PSSA and aluminum from the tunnels of the anode foils. Rinsing and removing the aluminum and PSSA from the anode foils after widening the tunnels will lead to higher foil capacitance gains and create a superior formation oxide. Providing a lower-impurity oxide leads to improved deformation and leakage current.

According to an embodiment, a method of processing an anode metal foil includes electrochemically etching the metal foil to form a plurality of tunnels in the metal foil. Then, the etched metal foil is disposed within a widening solution comprising PSSA, wherein the widening solution widens the plurality of tunnels in the metal foil. The etched metal foil is removed from the widening solution and sonicated in a liquid at a frequency less than 300 Hz, where the sonicating removes excess PSSA from the plurality of tunnels.

According to an embodiment, an apparatus includes a tank, a fluid inlet and a fluid outlet, and one or more tranducers. The tank is sized to receive a plurality of cartridges, each of the plurality of cartridges having a reservoir and being configured and arranged to hold a metal foil. The fluid inlet and fluid outlet are coupled with at least one of the plurality of cartridges, and are designed to introduce and expel, respectively, a liquid from the reservoir within at least one of the plurality of cartridges. The one or more transducers are coupled to at least one wall of each reservoir, the one or more transducers being designed to sonicate the liquid within each reservoir at a frequency less than 300 Hz.

Further embodiments, features, and advantages of the present apparatus and method, as well as the structure and operation of the various embodiments of the present apparatus and method, are described in detail below with reference to the accompanying drawings.

BRIEF DESCRIPTION OF THE DRAWINGS/FIGURES

The accompanying drawings, which are incorporated herein and form part of the specification, illustrate the methods and systems presented herein for processing an anode metal foil. Together with the detailed description, the drawings further serve to explain the principles of and to enable a person skilled in the relevant art(s) to make and use the methods and systems presented herein. In the drawings, like reference numbers indicate identical or functionally similar elements. Further, the drawing in which an element first appears is typically indicated by the leftmost digit(s) in the corresponding reference number.

DETAILED DESCRIPTION

The following detailed description of methods and systems for processing metal anode foils refers to the accompanying drawings that illustrate exemplary embodiments consistent with these methods and systems. Other embodiments are possible, and modifications may be made to the embodiments within the spirit and scope of the methods and systems presented herein. Therefore, the following detailed description is not meant to limit the methods and systems described herein. Rather, the scope of these methods and systems is defined by the appended claims.

It would be apparent to one of skill in the art that the methods and systems for processing metal anode foils, as described below, may be implemented in many different embodiments without departing from the scope of the description below. Thus, the operation and behavior of the methods and systems will be described with the understanding that modifications and variations of the embodiments are possible given the level of detail presented herein. It will be apparent to a person skilled in the relevant art that the methods and systems also be employed to produce porous anode foils for use in a variety of devices and applications in addition to use in an implantable cardioverter defibrillator (ICD).

Figure 1A:
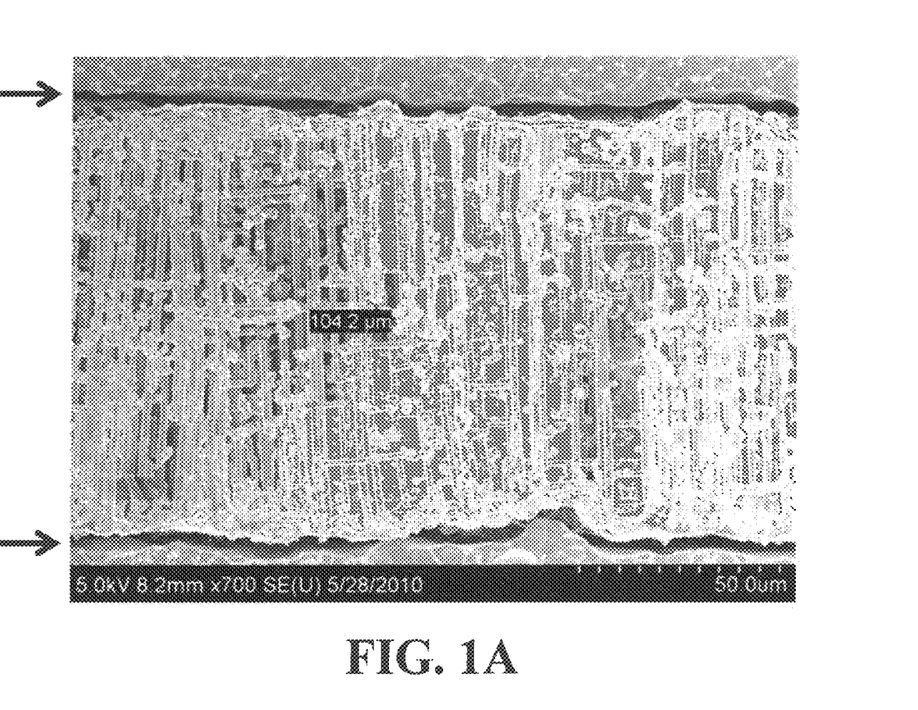
FIGS. 1A and 1B provide SEM photographs of metal foils with and without using PSSA in the widening solution.
Figure 1B:
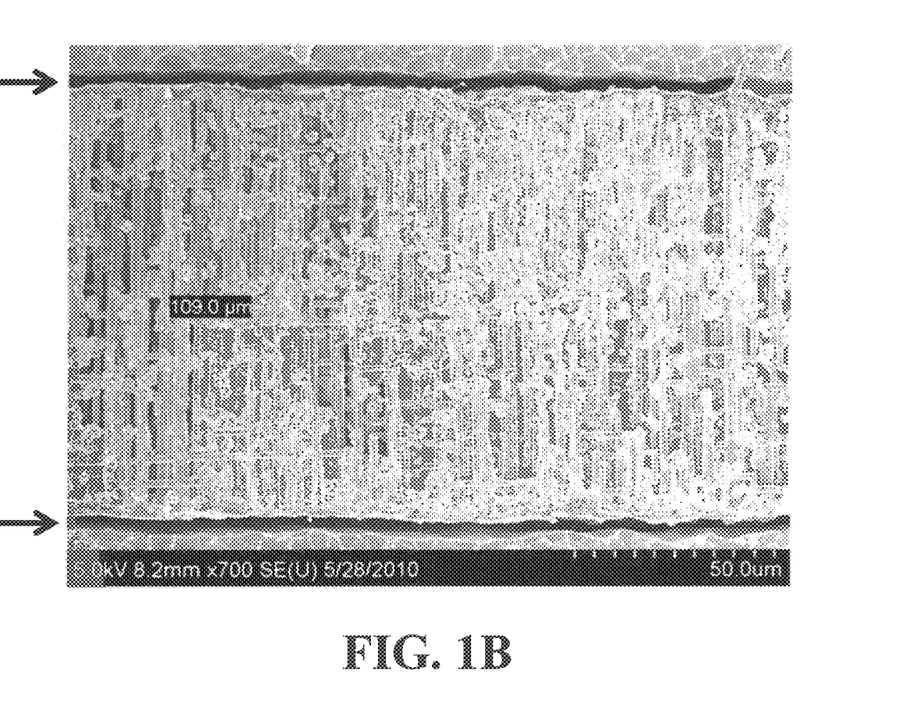

FIGS. 1A and 1B are scanning electron microscope (SEM) images of an aluminum foil. FIG. 1A is an image of the aluminum foil without using PSSA in the widening solution, while FIG. 1B is an image of an aluminum foil that included PSSA in its widening solution. In this example, the widening solution contained 10% by weight aluminum nitrate and 0.5% by weight nitric acid, while the widening solution with the PSSA included between 250 and 350 PPM PSSA. Each widening solution was maintained at a pH below 3. Other concentrations of aluminum nitrate and nitric acid may be used as well based on the material of the metal foil, desired amount of widening, and size of the metal foil.

Arrows have been added on the side of FIGS. 1A and 1B to identify the surface of the anode foil in each SEM image. As can be seen, the surface of the foil in FIG. 1A (no PSSA) is jagged and rough, while the surface of the foil in FIG. 1B (with PSSA) is more uniform. Additionally, the thickness of the anode foil is greater when PSSA is used. In this example, the anode foil in FIG. 1B (with PSSA) has a thickness around 109 microns while the anode foil in FIG. 1A (no PSSA) has a thickness around 104.2 microns. This is because the PSSA helps to protect the surface of the anode foil in the widening solution.

Including the PSSA in the widening solution is useful for creating more uniform, higher quality films as illustrated in FIGS. 1A and 1B. After widening, the PSSA should be removed from the anode films as it can disrupt the formation of the oxide on the aluminum surface. Additionally, any PSSA left in the tunnels can make it more difficult to remove the aluminum from the tunnels, thus decreasing their width and potentially forming clogs.

A cascading rinse under a fluid such as deionized water can be used to wash the PSSA from the anode foils. But this rinsing method often leaves PSSA within the tunnels. According to an embodiment, the anode foils are cleaned of PSSA using sonic vibration after the widening step. The anode foils may be sonicated in a fluid (e.g., deionized water) at lower frequencies than those normally used in an ultrasonic bath. For example, the anode foils are sonicated at a frequency between 50 Hz and 1 kHz, preferably at a frequency below 300 Hz, or below 100 Hz. The foils may be sonicated in other fluids other than deionized water, so long as the fluid does not damage or leave any residue behind on the anode foils. The increased rinsing energy from the vibrations allows a significantly improved rinse of the PSSA and aluminum for removal in the tunnels. The low frequencies are sufficiently energetic to clean out the tunnels, while being insufficiently energetic to damage the desirable microscopic features of the tunnel structures formed in prior processing of the anode foils. The hydraulic waves create differential pressure on the face of etched anode foils being washed within the bath which compel microscopic particles and residual chemistry from prior process steps out of the microscopic tunnels contained therein.

One reason for using lower frequencies is that higher (e.g., ultrasonic) frequencies would hydrate the foil. This hydration coupled with the vibrational energy being applied can cause pieces of the foil to break off exposing a fresh aluminum surface to be hydrated. This process may continue until the foil dissolves.

Numerous benefits are realized when using the sonicating rinse to remove PSSA and other impurities vs. a cascading rinse. For example, foil capacitance is increased when using the sonicating rinse to remove the PSSA. In one particular example, foil capacitance is increased by about 4% when using the sonicating rinse as compared to the cascading rinse to remove the PSSA. Additional benefits include increased porosity and therefore, an improved delivered to stored ratio (DSR) thus improving charging time of the capacitors. Also, less surface erosion on the foil surface improves the anode strength leading to higher anode punch yields. Because of the increased efficiency of the sonic vibrational energy, the sonic rinsing system reduces the necessary rinse process time from around 30 minutes to around 5 minutes.

It should be understood that although the anode foils described herein are formed from aluminum, use of other metal types may be possible as well. The sonic rinse described herein may similarly be used to clean impurities from microscopic tunnels within any metal foil.

Figure 2:
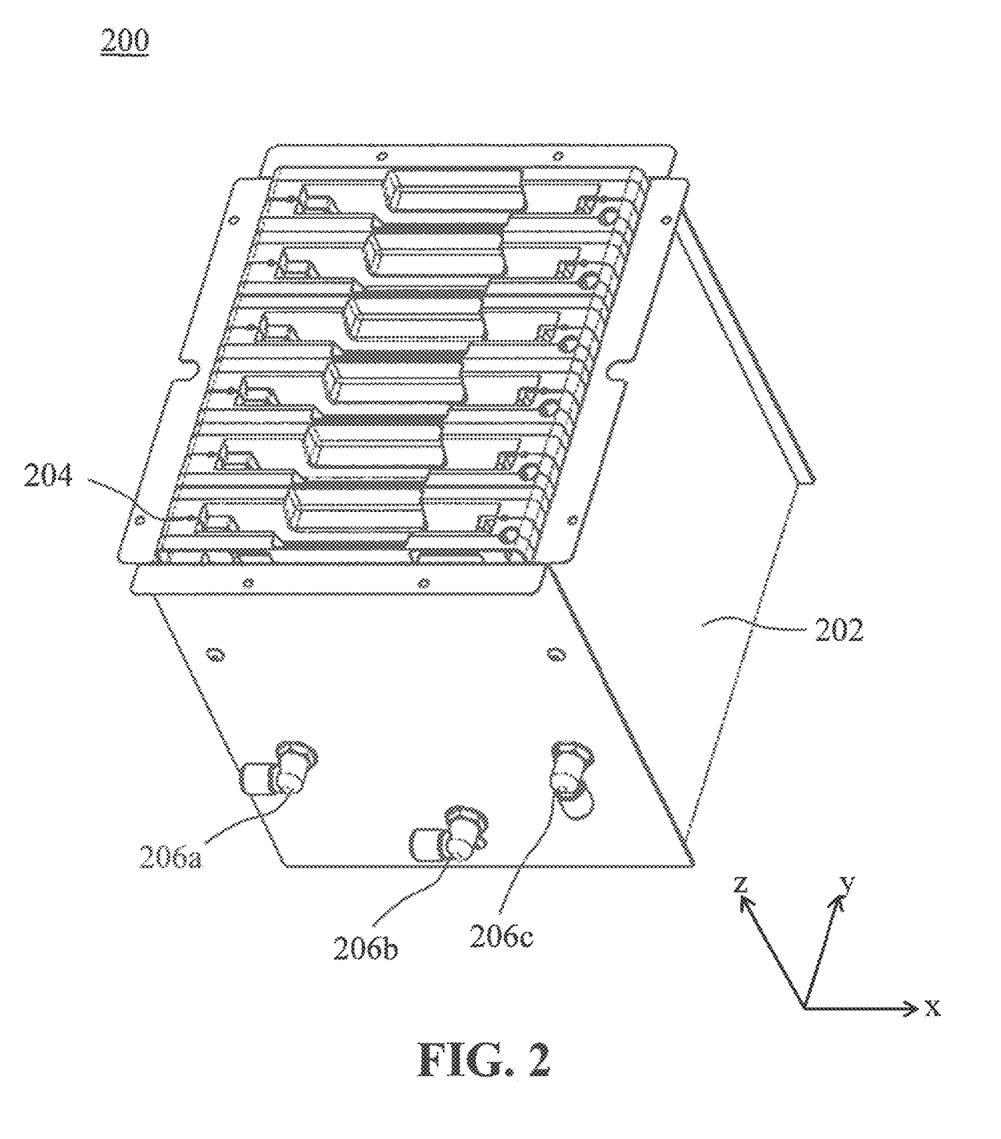
FIG. 2 provides an illustration of a bath apparatus, according to an embodiment.

FIG. 2 illustrates a bath system 200 used to perform a sonic rinse on multiple foils in parallel, according to an embodiment. Bath system 200 includes a tank 202 which may be molded from a polymer material such as polypropylene or polystyrene. Appropriate metal materials may be used as well for tank 202. In an embodiment, tank 202 is sized to receive a plurality of cartridges 204. These cartridges 204 may stack together within tank 202. In the example illustrated, six cartridges 204 fit within tank 202. In one example, cartridges 204 fit snuggly within tank 202. In other examples, cartridges 204 sit within tank 202 with freedom to move within tank 202. Tank 202 may be sized to fit any number of cartridges 204.

Each of cartridges 204 includes a reservoir for holding fluid. Each of cartridges 204 is also designed to hold a foil within the reservoir for performing a sonicating rinse on the foil. The fluid is brought into, and out of, each of cartridges 204 via a plurality of taps 206a-206c. The taps may be designed to introduce and expel fluid either into tank 202 around cartridges 204, or into and out of at least one of the reservoirs within cartridges 204.

In one example, tap 206a is arranged to introduce fluid into one or more of cartridges 204 while tap 206c is arranged to expel fluid from the one or more of cartridges 204. In this way, a continuous flow of fluid may be generated through the reservoirs of one or more of cartridges 204. The continuous flow may be recirculated through filters to allow fluid reuse and help conserve resources. The continuous flow ensures a constantly clean fluid around the anode foil, while the PSSA is being removed and washed away. The fluid used in the sonicating bath is deionized water, according to an embodiment. Other fluids may be used as well without deviating from the scope or spirit of the embodiments described herein.

Tap 206b may be used as a drain to remove substantially all of the liquid from the one or more cartridges 204. During normal operation, tap 206b may be valved shut or plugged to avoid any leaking of the liquid through tap 206b. When it is time to drain the liquid from each of the cartridges 204, tap 206b is opened and the liquid drains out. In another embodiment, any excess liquid that spills over into tank 202 may be removed from the system via tap 206b.

Figure 3A:
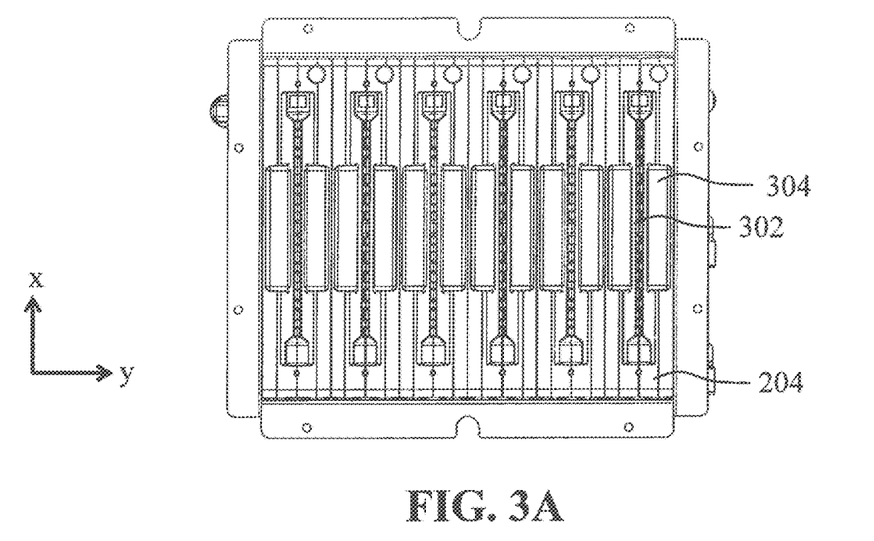
FIGS. 3A-3C provide illustrations of different views of the bath apparatus, according to some embodiments.
Figure 3B:
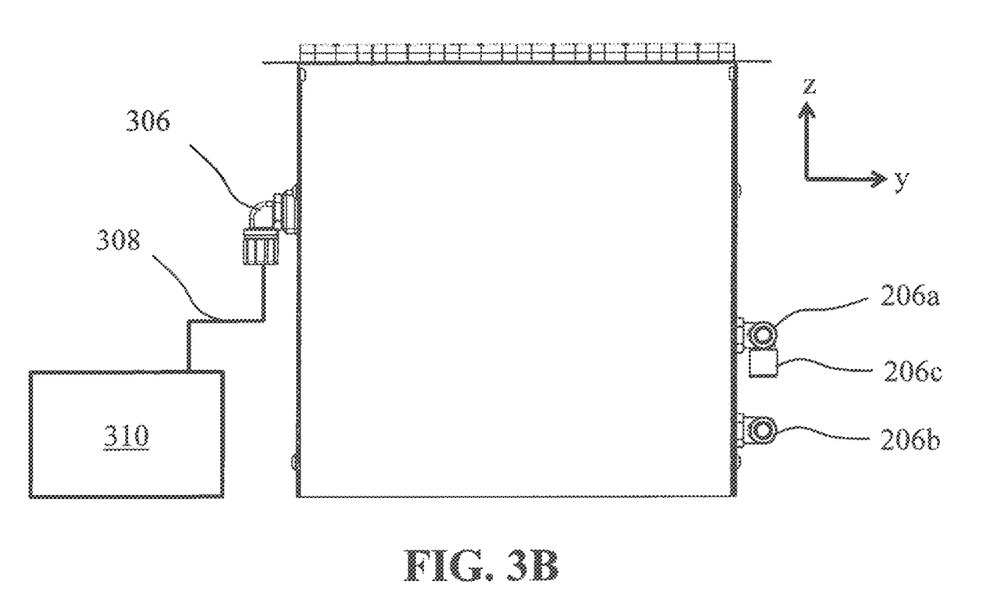
Figure 3C:
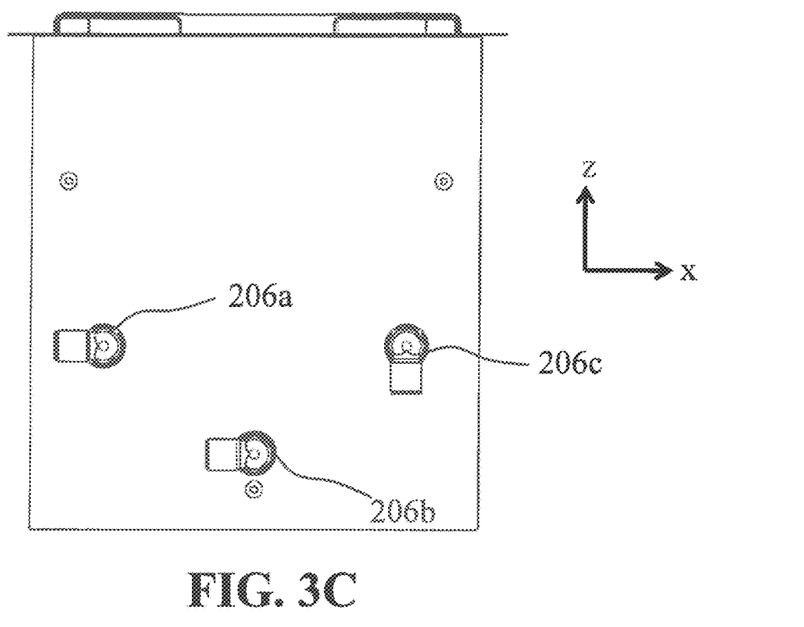

FIGS. 3A-3C illustrate various views of tank 202 holding cartridges 204, according to some embodiments.

FIG. 3A provides a top-down view of the tank opening. Each cartridge 204 can be seen having a reservoir 302. Reservoir 302 is where the anode foil is placed during the sonication process. Reservoir 302 also contains the liquid that will be sonicated. Reservoir 302 is designed with a thin shape to reduce the volume of liquid required to surround an anode foil placed within reservoir 302. For example, reservoir 302 may have an X dimension of around 12 inches, a Z dimension of around 12 inches, but a Y dimension of less than 1 inch. In another example, the V dimension of reservoir 302 is less than half of an inch. Many other sizes of reservoir 302 are possible depending on the size of tank 202 or cartridge 204. The two larger and opposite wall of reservoir 302 are coupled with transducers for creating the sonicating waves in the liquid is discussed in more detail below.

Each cartridge 204 also includes an indentation 304, according to an embodiment. Indentation 304 may be provided to facilitate insertion and removal of the foils into and out of reservoir 302. For example, indentation 304 on either side of reservoir 302 allows for a user to grip a foil within reservoir 302 with their fingers and remove the foil from reservoir 302.

FIG. 3B includes a side view of tank 202, according to an embodiment. Taps 206a-206c can be seen along the right-hand side of tank 202. On the opposite side is another tap 306. Tap 306 may be used to thread a power cable 308 through the wall of tank 202 to deliver electrical power to cartridges 204 within tank 202. The various transducers that generate the sonic waves require electrical power to operate, according to an embodiment. Power cable 308 may connect the transducers within tank 202 to a function generator 310. Function generator 310 is designed to produce an AC signal (or any other type of time-varying signal) to drive the transducers. The design and operation of such function generators is well known in the art.

FIG. 3C includes another side view of tank 202, according to an embodiment. This view shows the face of tank 202 that includes taps 206a-206c. Note that the placement and orientation of taps 206a-206c illustrated in the figure are provided by way of example. Other placements and orientations are possible.

Figure 4:
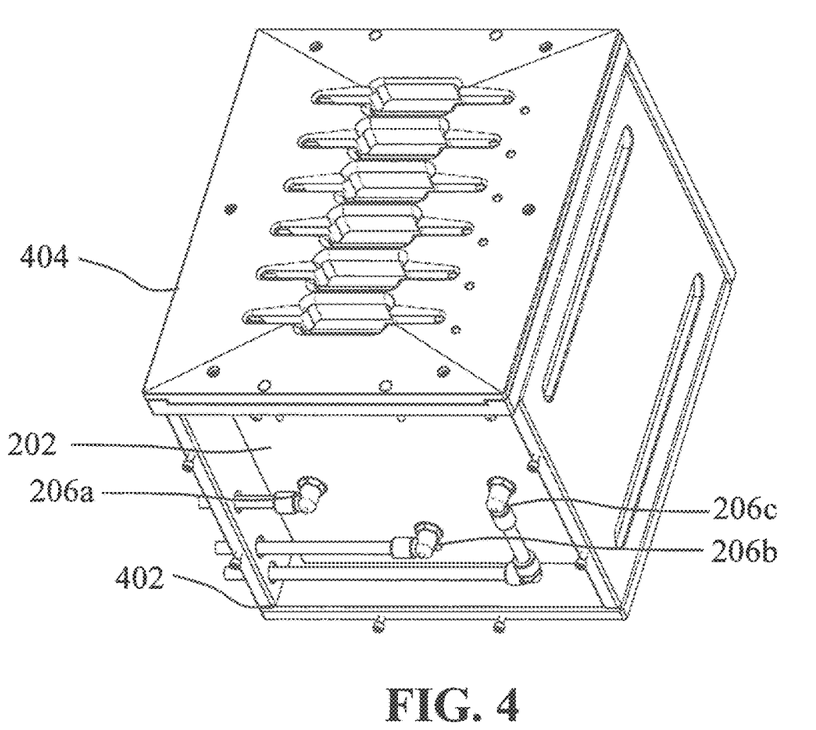
FIG. 4 is an illustration of the bath apparatus supported in a casing, according to an embodiment.

FIG. 4 illustrates tank 202 with an outer casing 402, according to an embodiment. Outer casing 402 may be used to facilitate the connection of pipes with taps 206a-206c. Also, a lid 404 may be used to cover the opening of tank 202 and protect cartridges 204 inside.

Figure 5A:
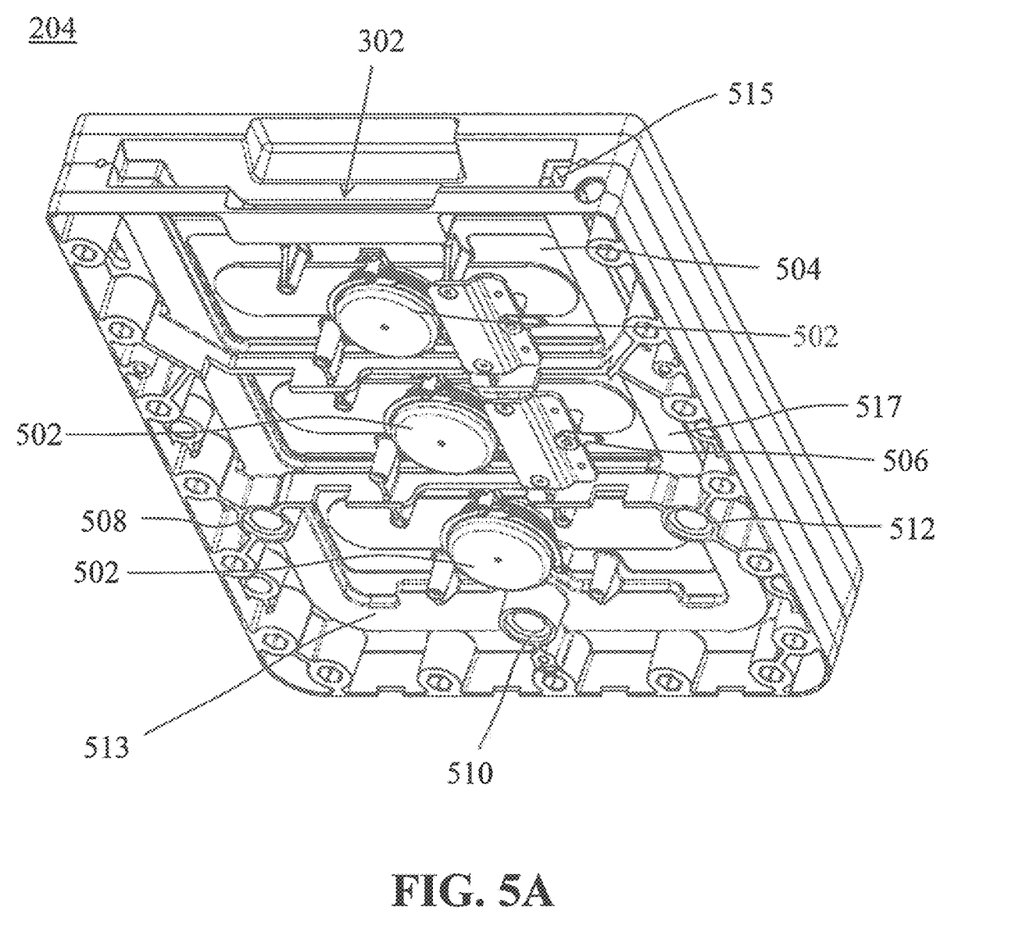
FIGS. 5A-5C provide illustrations of different views of a bath cartridge, according to some embodiments.
Figure 5B:
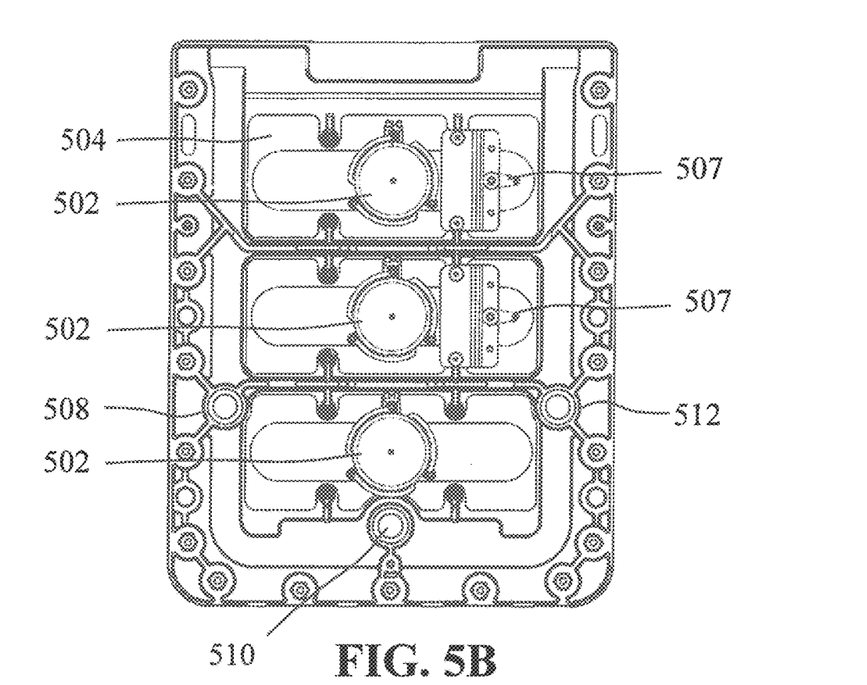
Figure 5C:
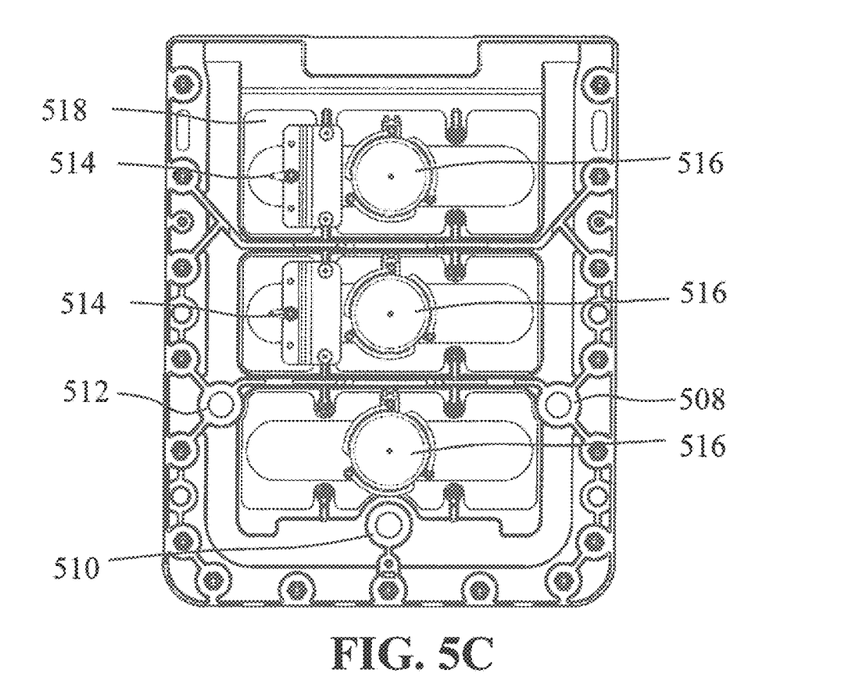

FIGS. 5A-5C provide more detailed views of a single cartridge 204, according to some embodiments. Each side of cartridge 204 includes a plurality of transducers 502, according to an embodiment. Transducers 502 are coupled to a wall 504 of reservoir 302 and are used to generate the sonic waves within reservoir 302. The opposite wall 518 includes a second plurality of similar transducers 516. Each of wall 504 and wall 518 of reservoir 302 is thin enough to act as a diaphragm that is vibrated by the transducers. Walls 504 and 518 may be formed from a polymer material such as polypropylene or polystyrene. Walls 504 and 518 may be machined to a thickness between 1 and 20 micrometers, preferably between 1 and 5 micrometers. The number and placement of transducers 502 and transducers 518 may vary. Transducers 502 and 518 may be electro-acoustic transducers. For example, transducers 502 and 518 include voice coil actuators for producing the necessary vibrations.

In the example where wall 504 is polystyrene, the frequency applied by transducers 502 may be between 130 and 150 Hz to maximize the amplitude of the produced waves. In another example where wall 504 is polypropylene, the frequency applied by transducers 502 is less than 100 Hz (e.g., 87 Hz) to maximize the amplitude of the produced waves. The applied frequency may be tuned based on the material used for wall 504, as well as the material used for forming each of cartridges 204. The above description applies equally to wall 518 and transducers 516.

Electrical connectors 506 are also illustrated for providing power to transducers 502. In one example, electrical connectors 506 are either male connectors (e.g. plugs) or female connectors (e.g., sockets). The male connectors and female connectors may alternate between two adjacent cartridges such that each of the cartridges connect (i.e., mate) with one another when they are stacked together. For example, FIG. 5B illustrates one face of cartridge 202 having male connectors 507 while the opposite face (illustrated in FIG. 5C) of cartridge 202 has female connectors 514. Thus, when different cartridges are stacked together, the male connectors 507 of one cartridge will fit into the female connectors 514 of the adjacent cartridge.

Although only two male connectors 507 are illustrated (one for each of the top two transducers) in FIG. 5B, it should be understood that a third male connector may also be used to connect with the bottom transducer. Having each of transducers 502 connected to its own electrical connector allows for three-phase driving of transducers 502. For example, each transducer 502 may be actuated 120 degrees out of phase from each other transducer 502. The above description applies equally to female connectors 514 and transducers 516.

According to an embodiment, transducers 502 are actuated out of phase with transducers 516 on the opposite side. This may help to increase the disruption formed in the liquid by the sound waves. In one example, transducers 502 are actuated 90 degrees out of phase with transducers 516. The various time-varying signals may be generated by function generator 310 and are applied to both transducers 502 and transducers 516.

Also illustrated in FIGS. 5A-5C are openings 508, 510, and 512, according to an embodiment. These openings correspond to taps 206a-206c to allow fluid to flow throughout the system. Each opening 508, 510, and 512 aligns with the corresponding openings of another stacked cartridge. In this way, fluid can flow along each opening through each of the one or more cartridges 204 stacked together in tank 202.

Within each cartridge, the fluid flows down through channel 513 and out into the bottom of reservoir 302 via openings along channel 513. The fluid then flows from the bottom-up, filling reservoir 302 until it overflows into port 515 positioned at the top of reservoir 302. Once the fluid flows into port 515, it drops down channel 517 and is expelled from the cartridge via opening 512. When the fluid is to be drained from each of the cartridges, tap 206b is opened, and all of the fluid drains out via opening 510.

Figure 6:
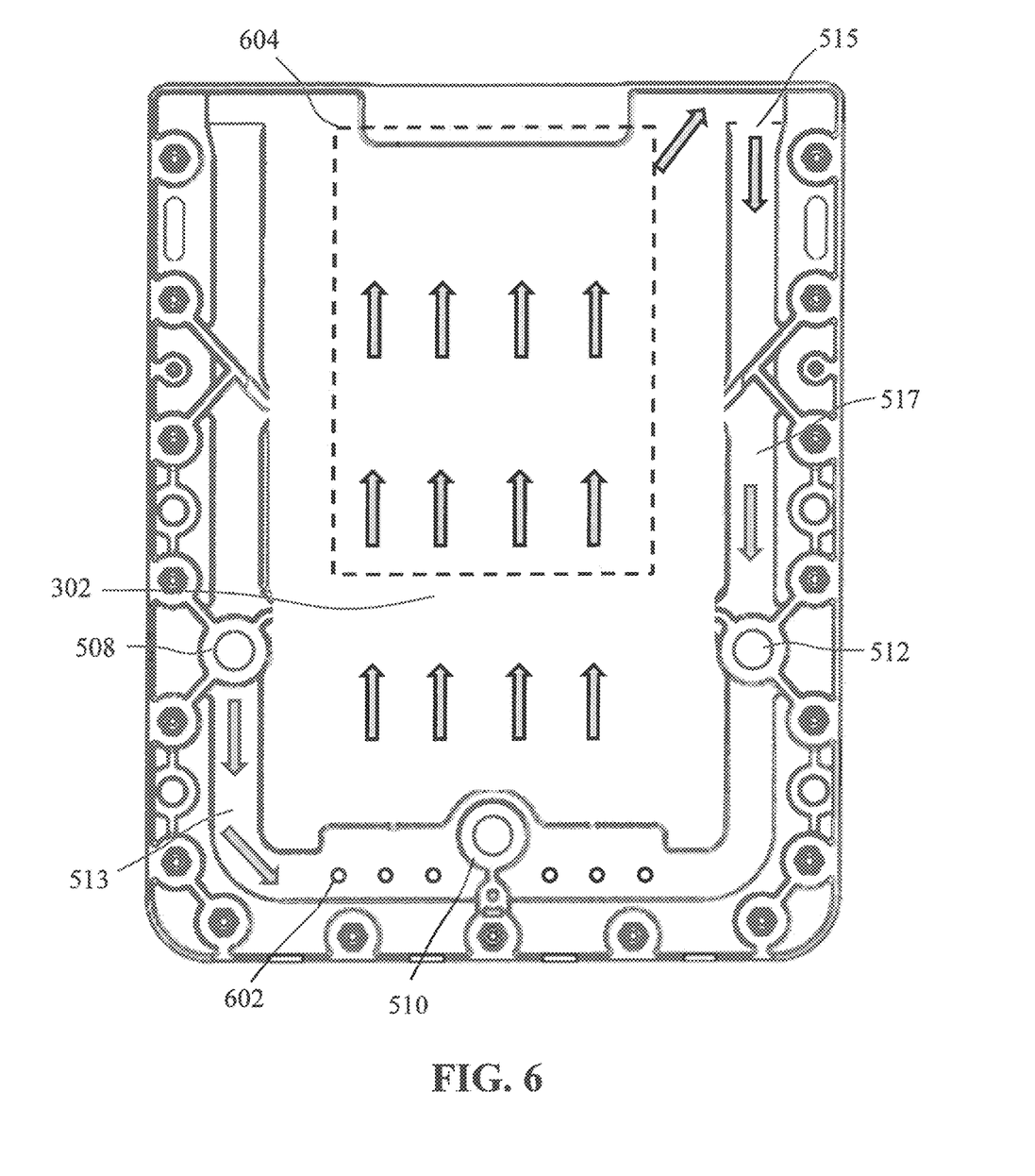
FIG. 6 provides an illustration of fluid flow through a cartridge, according to an embodiment.

The fluid flow path through a single cartridge is illustrated in more detail in FIG. 6, according to an embodiment. FIG. 6 provides a view looking into one half of cartridge 204 after separating cartridge 204 into two halves. The arrows indicate the fluid flow path through cartridge 204. For example, the fluid enters via opening 508 and drops down channel 513. The fluid then flows into the bottom of reservoir 302 via openings 602. Any number an size of openings 602 may be used. The fluid then flows from the bottom up over a foil 604 that is placed within reservoir 302. When the fluid reaches the top of reservoir 302, it spills over into port 515 and drops down channel 517. The fluid can then exit via opening 512. The bottom-up flow design of the fluid over the surface of foil 604 allows for a more even and controllable flow across the foil surface.

Figure 7:
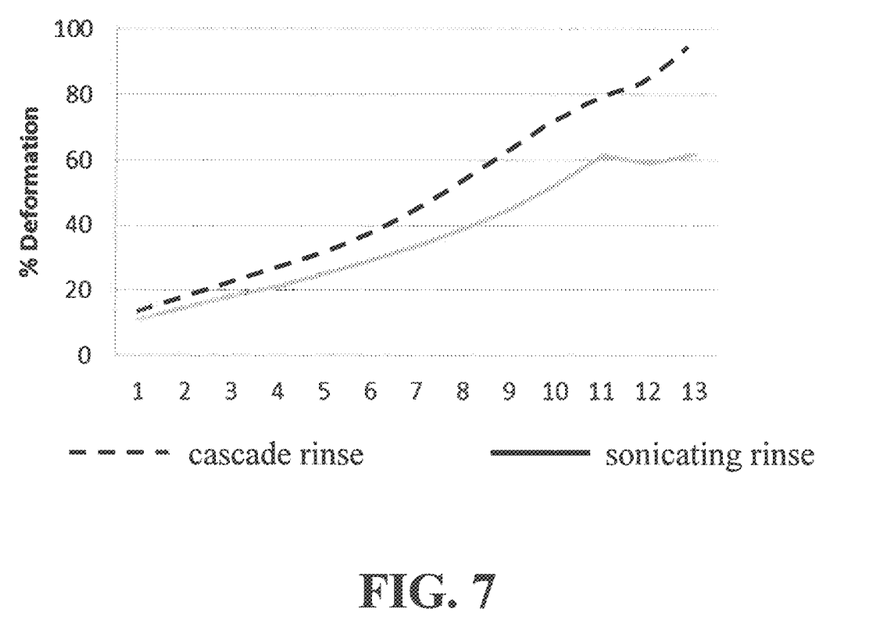
FIG. 7 is a graph of voltage deformation of an anode foil with and without using a sonic rinse step.

FIG. 7 provides an example data plot illustrating the changing voltage deformation of a capacitor over a series of charge/discharge cycles when the anode foil used in the capacitor is rinsed using the conventional cascade rinse and when the anode foil is rinsed using the sonicating bath technique. A capacitor with a lower % deformation needs less energy to charge the capacitor over the life of a battery and thus extends the battery life/device life. As can be seen, the capacitor that includes the anode foil rinsed using the sonicating bath technique exhibits less voltage deformation over 13 testing cycles. In this example, the deformation was reduced by about 35%. Additionally, after 11 testing cycles, the deformation of the capacitor with the foil rinsed using the sonication method does not increase compared to the control (i.e., conventional cascading rinse).

The capacitors used in the test were aluminum electrolytic capacitors around 110 to 130 microfarads. The initial charge time of the capacitors is measured at a voltage of 900 Volts with an stored energy of 44 J @ 900 Volts at 37 deg C. After the initial charge time is measured, the capacitors are placed in into a 90 deg C. oven for 22 hours. The 22 hours at 90 deg C. simulates 4 months at 37 deg C. After the 22 hours, the charge time is measured to reach 900 Volts at 37 deg C. This procedure represents one testing cycle and is repeated 13 times to generate the data plot of FIG. 7. The % deformation during each testing cycle (also known as a "down") is calculated by equation (1).

$$\frac{\text{Charge } Time_{Down} - \text{Charge } Time_{initial}}{\text{Charge } Time_{initial}} \times 100\% \qquad (1)$$

Based on the data provided in FIG. 7, capacitors tested for deformation using the proposed method described herein of washing the anode foils in a sonicating bath may exhibit a reduced deformation per working voltage and a distinct deformation curve after the $10^{th}$ testing cycle. The reduced deformation and distinct deformation curve is due to the significant reduction of impurities (e.g., PSSA) on the anode foils prior to creation of a high quality oxide on the outer surface of the anode foil.

Figure 8:
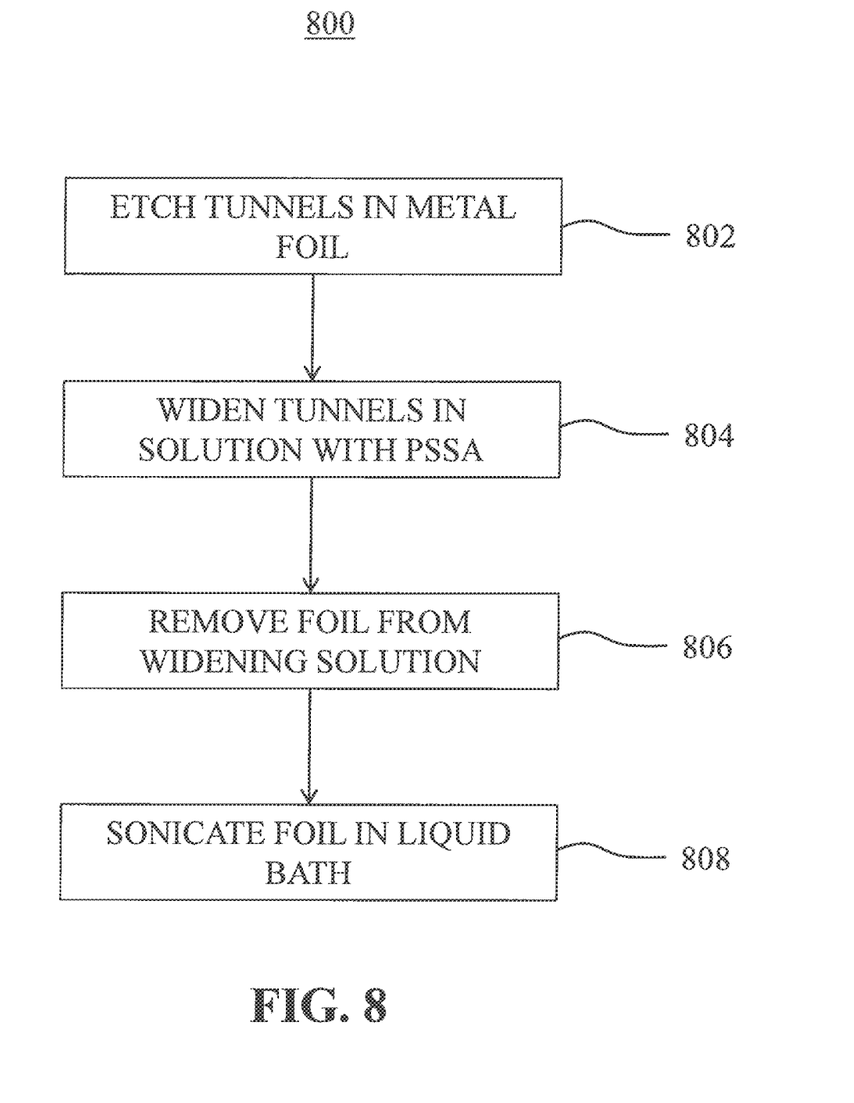
FIG. 8 is a flowchart of an example method of forming tunnels in an anode foil.

FIG. 8 provides an example method 800 of processing an anode foil. In one example, the anode foil is an aluminum foil used as the anode within a capacitor or battery. Any step(s) of method 800 that involve sonication of the anode foils may be performed using bath system 200.

Method 800 starts at block 802 where a plurality of tunnels are electrochemically etched in a metal foil. This electrochemical etching process has been previously described, for example, in co-owned U.S. Pat. No. 8,888, 967, the disclosure of which is incorporated herein by reference.

At block 804, the electrochemically etched tunnels are widened by placing the foil in a widening solution. The widening solution may contain 5-15% by weight aluminum nitrate, 0.2-0.8% by weight nitric acid, and between 250 and 350 ppm of PSSA. The widening solution may be maintained at a pH below 5, or at a pH below 3. The PSSA helps to protect the surface of the aluminum foil, thus allowing for more efficient widening of the tunnels.

At block 806, the foil is removed from the widening solution and placed into a livid bath (e.g., reservoir) for removal of the PSSA, any other impurities, and excess aluminum from the tunnels. In an embodiment, the foil is placed into a geometrically thin reservoir having dimensions around 12"×12"×0.5" as described herein. The 12"×12" dimensions of the reservoir may be changed to accommodate different foil sizes.

At block 808, the liquid bath with the foil is sonicated to remove the PSSA, any other impurities, and excess aluminum from the surface of the foil, and from within the electrochemically etched tunnels. The sonication may be performed by one or more transducers coupled to one or more of the walls of the reservoir. According to an embodiment, the sonication is performed at a frequency less than 300 Hz.

Figure 9:
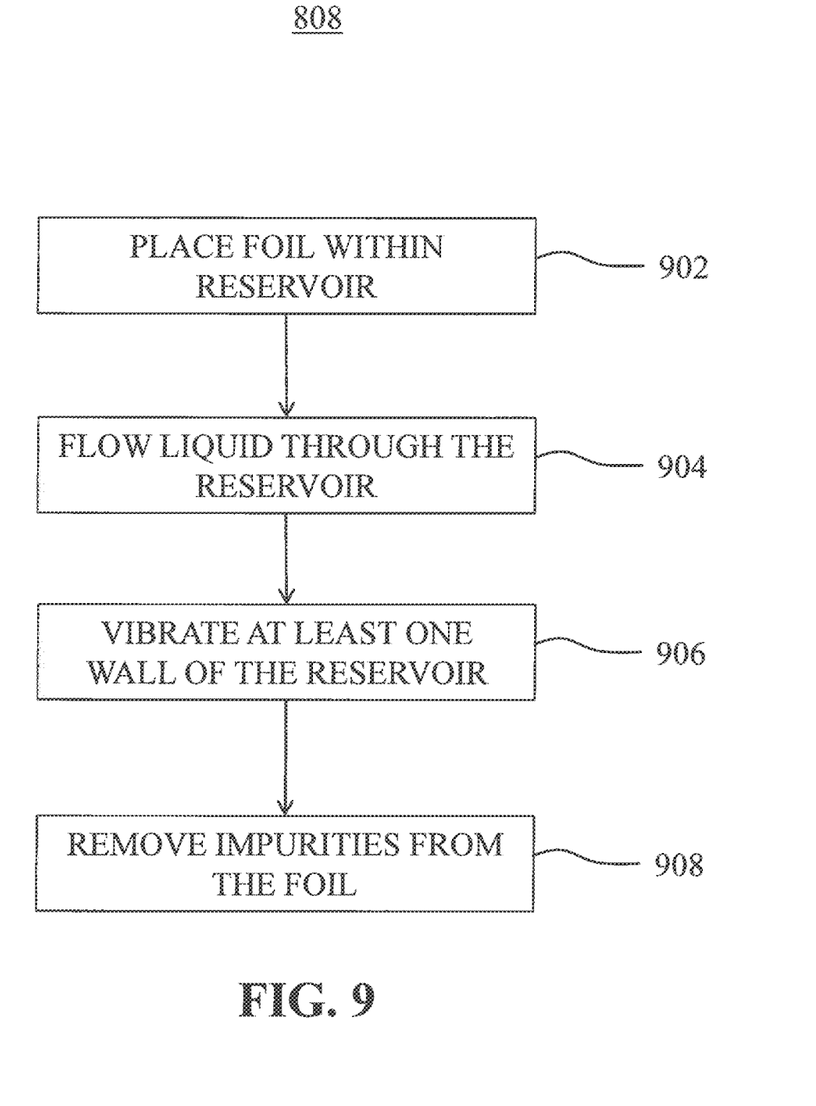
FIG. 9 is a flowchart of an example method for sonicating an anode foil.

FIG. 9 shows an example of step 808 from method 800 in more detail. In this example, the anode foil is an aluminum foil used as the anode within a capacitor or battery.

Method 808 begins at block 902 where the aluminum foil is placed within a reservoir for removal of PSSA, any other impurities, and excess aluminum.

At block 904, a liquid is flown through the reservoir. In one example, the liquid is de-ionized water. The liquid may be continuously flown through the reservoir to maintain clean liquid around the foil. In one example, the liquid may be recirculated through the reservoir.

In an embodiment, the liquid is flown through the reservoir such that the liquid enters at a bottom portion of the reservoir and exits from a top portion of the reservoir. This "bottom-up" flowing of the liquid through the reservoir provides a less turbulent flow across the surface of the foil within the reservoir.

At block 906, at least one wall of the reservoir is vibrated using one or more transducers. These vibrations produce hydraulic pressure waves in the liquid which cleans out impurities (e.g., PSSA) from the surface and tunnels of the foil. In one embodiment, opposite walls of the reservoir are vibrated out of phase with one another. The frequency of the vibrations is kept less than about 300 Hz so as not to damage the delicate microstructures in the foil. Other frequency ranges may be used depending on a variety of factors including the nature of the impurities (e.g. how strongly adhered they are to the surface), the geometry of the tunnels in the foil, and the construction of the apparatus (e.g., cartridge 204.)

At block 908, the vibrations remove PSSA, and any other impurities, from the surface and tunnels of the foil. The removed impurities (and excess aluminum) may then be swept away via the continuously flowing liquid through the reservoir.

It is to be appreciated that the Detailed Description section, and not the Summary and Abstract sections, is intended to be used to interpret the claims. The Summary and Abstract sections may set forth one or more but not all exemplary embodiments of the present system and method as contemplated by the inventors, and thus, are not intended to limit the present method and system and the appended claims in any way.

Moreover, while various embodiments of the present system and method have been described above, it should be understood that they have been presented by way of example, and not limitation. It will be apparent to persons skilled in the relevant art(s) that various changes in form and detail can be made therein without departing from the spirit and scope of the present system and method. Thus, the present system and method should not be limited by any of the above described exemplary embodiments, but should be defined only in accordance with the following claims and their equivalents.

In addition, it should be understood that the figures, which highlight the functionality and advantages of the present system and method, are presented for example purposes only. Moreover, the steps indicated in the exemplary system(s) and method(s) described above may in some cases be performed in a different order than the order described, and some steps may be added, modified, or removed, without departing from the spirit and scope of the present system and method.

What is claimed is:

1. An apparatus, comprising:
a tank configured to receive a plurality of cartridges, each of the plurality of cartridges having a fluid reservoir configured to hold a metal foil;
a fluid inlet and a fluid outlet coupled with at least one of the plurality of cartridges, and configured to introduce and expel, respectively, a liquid from the reservoir within the at least one of the plurality of cartridges; and
one or more transducers coupled to at least one wall of each reservoir, the one or more transducers configured to sonicate the liquid within each reservoir at a frequency less than 300 Hz.

2. The apparatus of claim 1, further comprising a fluid tap configured to drain liquid from the plurality of cartridges.

3. The apparatus of claim 1, further comprising one or more second transducers coupled to an opposite wall from the at least one wall of each reservoir.

4. The apparatus of claim 3, wherein the one or more transducers are actuated out of phase with the one or more second transducers.

5. The apparatus of claim 1, wherein a thickness of each of the reservoirs is less than one inch.

6. The apparatus of claim 1, wherein a thickness of each of the reservoirs is less than half of an inch.

7. The apparatus of claim 1, wherein each of the plurality of cartridges are arranged in a stack within the tank.

8. The apparatus of claim 1, wherein the at least one wall has a thickness between 1 and 5 micrometers.

9. The apparatus of claim 8, wherein the at least one wall comprises polypropylene and the one or more transducers actuate the at least one wall at a frequency less than 100 Hz.

10. The apparatus of claim 8, wherein the at least one wall comprises polystyrene and the one or more transducers actuate the at least one wall at a frequency between 130 and 150 Hz.

* * * * *